United States Patent
Iyer

(10) Patent No.: US 10,536,579 B2
(45) Date of Patent: Jan. 14, 2020

(54) SYSTEM, METHOD AND MARKETPLACE FOR REAL-TIME INTERACTIVE VIDEO/VOICE SERVICES USING ARTIFICIAL INTELLIGENCE

(71) Applicant: Sriram Venkataramanan Iyer, Chennai (IN)

(72) Inventor: Sriram Venkataramanan Iyer, Chennai (IN)

( * ) Notice: Subject to any disclaimer, the term of this patent is extended or adjusted under 35 U.S.C. 154(b) by 179 days.

(21) Appl. No.: 15/788,887

(22) Filed: Oct. 20, 2017

(65) Prior Publication Data
US 2018/0115645 A1  Apr. 26, 2018

Related U.S. Application Data

(60) Provisional application No. 62/411,851, filed on Oct. 24, 2016.

(51) Int. Cl.
*H04M 3/523* (2006.01)
*G06N 5/02* (2006.01)
(Continued)

(52) U.S. Cl.
CPC .......... *H04M 3/5233* (2013.01); *G06N 5/022* (2013.01); *G06Q 10/063112* (2013.01);
(Continued)

(58) Field of Classification Search
CPC ............. H04M 3/5233; H04M 3/5175; H04M 3/4936; H04M 2203/401; H04M 2203/558; H04M 1/6033; H04M 1/0202; H04M 2201/40; H04M 2207/185; H04M 3/2236; H04M 3/42382; H04M 7/006; H04M 15/00; H04M 15/8027; H04M 1/72522; H04M 2203/402; H04M 2215/7428; H04M 2250/12; H04M 2250/22; H04M 2250/74; H04M 3/367; H04M 3/42221; H04M 3/493; H04M 3/51; H04M 3/5158; H04M 3/5166; H04M 3/5183; H04M 3/5191; H04M 3/5237; H04M 3/527; H04M 7/0084;
(Continued)

(56) References Cited

U.S. PATENT DOCUMENTS 8,874,586 B1 * 10/2014 Sommers .......... G06F 16/24578
707/748
9,509,846 B1 * 11/2016 Jandwani ............ H04M 3/5232
(Continued)

*Primary Examiner* — Akelaw Teshale

(57) ABSTRACT

A method for intelligently connecting seekers to advisors and providing recorded or synthesized answers to the seekers using artificial intelligence is provided. Receiving a topic of interest from a seeker or retrieving advisors with expertise in the topic from a database of advisors, filtering and sorting the advisors based on ratings associated with each of the advisors related to the topic using machine learning and a plurality of criteria specified by the seeker, routing and establishing a call between the seeker and advisor, when the advisor is unavailable the call is rescheduled for alternate time windows of the advisor or with an alternate advisor and recording and storing the call for automating the answers to the similar questions, obtaining feedback from the seeker for the advisor, and updating the intelligent call routing system and the rankings of the advisor based on the plurality of criteria.

11 Claims, 15 Drawing Sheets

(51) Int. Cl.
  *G06Q 10/06* (2012.01)
  *H04M 3/493* (2006.01)
  *H04M 3/51* (2006.01)
  *G10L 15/26* (2006.01)

(52) U.S. Cl.
  CPC ............ *G10L 15/26* (2013.01); *G10L 15/265* (2013.01); *H04M 3/4936* (2013.01); *H04M 3/5175* (2013.01); *H04M 2203/401* (2013.01); *H04M 2203/558* (2013.01)

(58) Field of Classification Search
  CPC .................. G10L 15/26; G10L 15/265; G06Q 10/063112; G06N 5/022
  See application file for complete search history.

(56) References Cited

U.S. PATENT DOCUMENTS

| | | | |
|---|---|---|---|
| 2013/0064358 A1* | 3/2013 | Nusbaum .......... | H04M 3/42068 379/88.16 |
| 2013/0195258 A1* | 8/2013 | Atef .................. | H04L 67/34 379/88.01 |
| 2015/0281454 A1* | 10/2015 | Milstein ............. | G06Q 10/1097 379/265.12 |
| 2016/0191711 A1* | 6/2016 | Dopiro ................ | G06F 16/248 715/739 |
| 2016/0352901 A1* | 12/2016 | Jandwani .......... | H04M 15/8083 |
| 2017/0103171 A1* | 4/2017 | Sentell ................ | G06F 19/328 |

* cited by examiner

602

DR. John Smith

MBBS, DOMS,

OPHTHALMOLOGIST/ EYE SURGEON,

4/5

DR. JOHN SMITH IS A CONSULTANT OPHTHALMOLOGIST, HAVING 8 YEARS EXPERIENCE

INFO | FEEDBACK(382)

SORT BY : MOST HELPFUL

| ALL | EYE CHECKUP - GENERAL | EYE INFECTION | EYE PAIN | POOR EYE SIGHT |

RESULTS (134) :

John Smith     5 DAYS AGO

EXPLANATION ON THE HEALTH ISSUE WAS GOOD

600

Q1. WOULD YOU LIKE TO RECOMMEND THE DOCTOR?

| YES | NO |
|---|---|

Q2. WHAT IMPRESSED YOU DURNING YOUR VISIT?

- ☐ DOCTOR FRIENDLINESS
- ☐ EXPLANATION OF THE HEALTH ISSUE
- ☐ TREATMENT SATISFACTION
- ☐ VALUE FOR MONEY
- ☐ WAIT TIME

700

Q3. TELL US ABOUT YOUR EXPERIENCE WITH THE DOCTOR.

START TYPING HERE...

YOUR NAME

YOUR EMAIL ADDRESS

SYSTEM, METHOD AND MARKETPLACE FOR REAL-TIME INTERACTIVE VIDEO/VOICE SERVICES USING ARTIFICIAL INTELLIGENCE

BACKGROUND

Technical Field

The embodiments herein generally relate to a real-time advisory system and method for intelligently matching seekers with advisors, providing communication over a voice and/or video call between advisors and seekers and automatically providing relevant answers to the seekers using a machine learning system.

Description of the Related Art

A seeker intending to reach a suitable person to discuss a topic of interest to the seeker and/or seek a solution for a problem that the seeker faces may find it difficult to contact a suitable person without knowing the contact information. Therefore, the seeker must seek the solution from other knowledgeable persons or perform a search in a traditional phone directory or internet based search, the results of the search may not contain all the solutions that are useful for the seeker. The seeker may need a suitable advisor based on his/her criteria such as the quality, suitability, and cost of the services. Often the availability of a suitable person or the contact information of a suitable person may not be readily available or be up-to date. The seeker then may have to struggle through a phone directory or click on multiple search results and read several websites to determine the suitable advisor to call using the disparate sources to obtain the contact number or user-id. Additional and useful information such as the cost of the services or solutions, suitability of the person for the seeker is not readily available from a single source or in a unified location due to which the seeker may need to collate such information from multiple disparate sources resulting in an inconvenience or a time-consuming series of actions by the seeker before the seeker can decide whom to call.

Once the contact information is known and the seeker has decided whom to call the seeker does not usually know the real-time availability of the suitable advisor. The availability of the suitable advisor is only known by calling the suitable advisor and if the suitable advisor is unavailable to answer the call, then the user may face a time-consuming 'trial and fail' process or be placed on hold or transferred to another responder or must leave a message on an answering device or other digital or human assistants. In some situations, the seeker may have to reach someone but not necessarily the most appropriate responder for his/her chosen topic of interest. In certain cases, the seeker may have reached the most appropriate advisor but not have the ability to contact the same advisor again.

Accordingly, there remains a need for a real-time advisory system and method for intelligently fetching advisors to seekers and providing recorded solutions to the seekers using a machine learning system.

SUMMARY

In view of the foregoing, an embodiment herein provides a method for intelligently connecting seekers to advisors and providing recorded or synthesized answers to the seekers using artificial intelligence. The method includes receiving a topic of interest from a seeker and retrieving a plurality of advisors relevant to the topic of interest from a database of advisors, filtering the plurality of advisors based on ratings associated with each of the advisors related to the topic of interest based on a plurality of criteria specified by the seeker or on a machine learning based ranking of the advisors for the given topic, sorting the plurality of advisors based on a plurality of criteria specified by the seeker; displaying the plurality of advisors based on the topic of interest and ratings of each advisor, establishing a call between the seeker and an advisor. The advisor is selected based on the ratings of the advisor and the plurality of criteria specified by the seeker or selected by the seeker from a ranked result set or chosen automatically based on the seeker's preference using an optimum call routing method and the optimum routing method comprises one or more communication methods, reestablishing a communication link for the call between the seeker and the advisor when the call is not completed or for alternate time windows of the advisor when the selected advisor is unavailable, recording and storing the call for automating the answers and the recorded call comprises questions asked by the seekers and answers provided by the plurality of advisors and the recorded questions are stored in a database of recorded questions and the answers are stored in the database of recorded answers, converting a speech advice into text using a speech-to-text conversion module and the speech-to-text conversion module translates audio into a language that a computer recognizes by picking up vibrations from the speech and feeding the vibrations to an analog-to-digital convertor for translating vibrations into digital data in text form, obtaining feedback from the seeker for the advisor the feedback is used for analysis and to improve future search results, on a plurality of criteria specified by the seeker; updating the intelligent call routing system and the ratings of the advisor based on the plurality of criteria specified by the seeker and the topic of interest, and receiving a topic of interest from a current seeker and identifying a level of similarity between questions asked by the current seeker with the recorded questions asked by the plurality of seekers to provide the recorded answers using a semantic system.

The plurality of criteria includes at least one of (i) language, (ii) experience of the seeker in the past with the same advisor, (iii) subjective feedback, (iv) objective feedback, (v) a location, (vi) a cost, (vii) an availability and a rating of the advisor for each topic. The one or more call methods is selected from an optimum call connection or packet routing method (peer-to-peer) or conventional routing and connecting a voice or video call with the advisor. The database of recorded answers is curated or augmented by external research and publications of expert advice on the topic of interest.

In another embodiment, a real-time advisory system for providing advice to seekers using artificial intelligence is provided. The real-time advisory system includes a memory that stores a plurality of databases and the plurality of databases includes a database of seekers, a database of topics, a database of advisors, a database of recorded answers and a database of call history and quality metrics and a processor that executes artificial intelligence. The topic wise rankings of advisors are calculated and answers are recommended to questions automatically based on transcripts of previous answers related to the topic. The artificial intelligence includes a call routing module, a call recording and speech-to-text conversion module, a feedback obtaining module, and a rating module. The call routing module, executed by the processor, establishes a voice or a video call between a seeker and an advisor, wherein the advisor is selected based on the ratings of the advisor and the plurality of criteria specified by the seeker. The call is rescheduled for alternate time windows of the advisor or with an alternate advisor when the selected advisor is unavailable. The call recording and speech-to-text conversion module, executed by the processor, records questions asked by the seekers and answers provided by the advisors during the call for partially or fully automating the answers for future seekers, and converts the recorded call of previous conversations between the seekers and the advisors into text using a speech-to-text conversion module for providing recorded answers to the seekers for the same or similar questions while comparing the recorded questions of previous questions and answers using a machine learning based ranking and synthesis module. The feedback obtaining module, executed by the processor, obtains feedback from the seeker for the advisor. The feedback is analyzed and the rankings of the advisor for the topic of interest is calculated and a ratings module, executed by the processor, captures and stores ratings in a form of a numerical, a text, a video or a voice based feedback of the seekers and the advisors on each other's quality of the advice or conversation upon completion of the call from both seeker and advisor for use in future searches.

The real-time advisory system automatically fetches advisors or recorded answers to the seeker using a machine learning system based on the plurality of criteria specified by the seeker and topic of interest. The feedback given by the seeker to the advisor is used for updating the ratings of the advisor. Based on the seeker preference, the seeker can obtain answers to the questions through the virtual assistant or text form of the recorded answers or the real-time advice from the advisor.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 8 is a seeker interface view for obtaining a subject feedback of the advisor at the end of the call according to an embodiment herein;

DETAILED DESCRIPTION OF PREFERRED EMBODIMENTS

Figure 1:
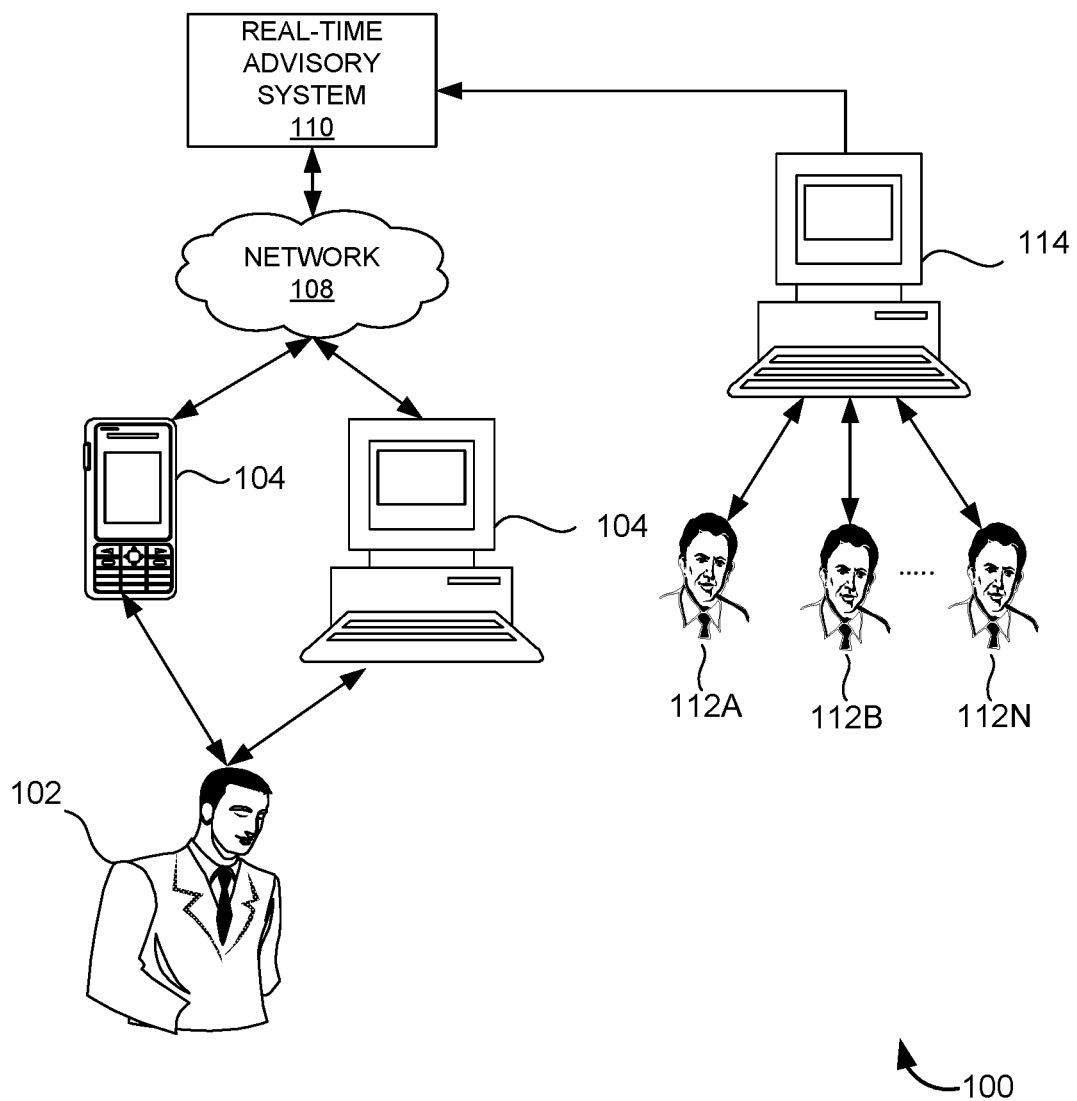
FIG. 1 illustrates a system view of a seeker communicating with a real-time advisory system to obtain answers system for questions based on topic of interest of the seeker according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a real-time advisory system and method for intelligently fetching advisors to seekers and providing recorded solutions to the seekers through a virtual assistant using a machine learning system. Referring now to the drawings, and more particularly to FIGS. 1 through 13, where similar reference characters denote corresponding features consistently throughout the figures, preferred embodiments are shown.

FIG. 1 illustrates a system view 100 of a seeker 102 communicating with a real-time advisory system 110 to obtain answers for questions based on the topic of interest of the seeker 102 according to an embodiment herein. The seeker 102 interacts with the real-time advisory system 110 through a communication device 104. The communication device 104 may be a laptop, a mobile phone, a tablet, and/or a personal computer. The real-time advisory system 110 automatically provides full or partial answers to the seeker 102. The real-time advisory system 110 analyzes questions asked by the seeker 102 to fetch a plurality of advisors or to provide answers from a database of recorded answers. The system view 100 further includes a network 108, one or more advisors 112A-N, and a second computing device 114. In one embodiment, the real-time advisory system 110 is a server that communicates with the seeker 102 through the network 108 to (a) analyze the questions asked by the seeker 102 based on topic of interest of the seeker 102, and (b) fetch the plurality of advisors based on the topic of interest of the seeker 102 and a plurality of criteria specified by the seeker 102. The real-time advisory system 110 automatically provides automated answers to the questions asked by the seeker 102 from a database of recorded answers.

In an embodiment, the real-time advisory system 110 includes answers provided by an artificial intelligence (AI) or machine learning (ML) system that provides learned rankings and synthesis capability that provides a list of advisors with ranking and the advisor selected by the seekers provides advice to the seeker 102, or partial answers to the seekers 102, and stores and analyses feedback given by seekers before updating ratings of the advisors. The real-time advisory system 110 compares the similarity of questions asked by other seekers with database of recorded questions before fetching the advisor or answers to the seekers using. In one embodiment, the machine learning system library may be defined by active and reinforced supervised learning and may be implemented using any suitable software or hardware platform.

Figure 2:
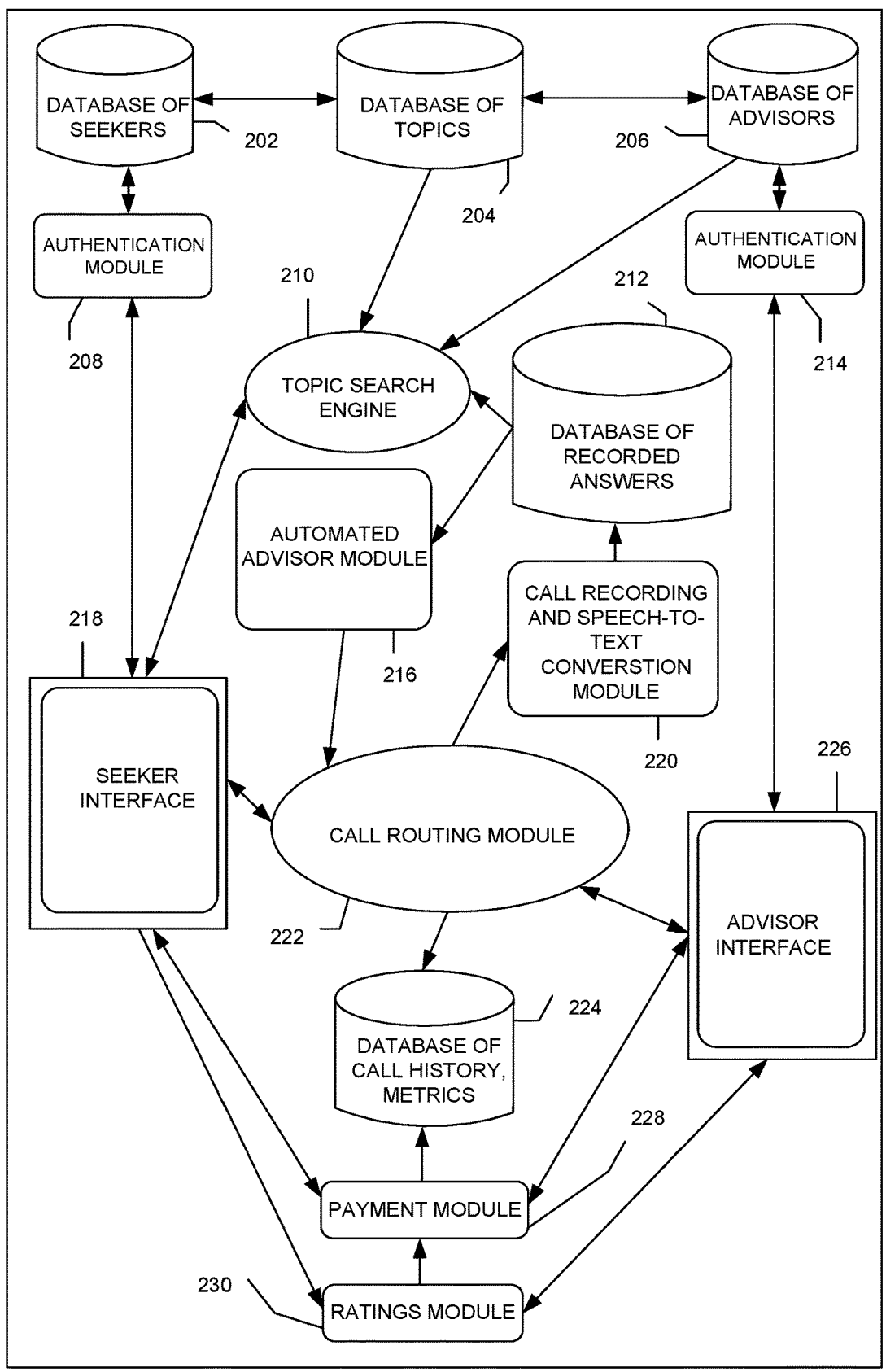
FIG. 2 illustrates an exploded view of the real-time advisory system of FIG. 1 according to an embodiment herein.

FIG. 2 illustrates an exploded view of the real-time advisory system 110 of FIG. 1 according to an embodiment herein. The real-time advisory system 110 includes a plurality of databases, an intelligent call routing and an automated answering system that uses machine learning. The plurality of databases includes a database of seekers 202, a database of topics 204, a database of advisors 206, a database of recorded answers 212, and a database of call history and metrics 224. The intelligent call routing and an automated answering system includes an authentication module 208, a topic search engine 210, a call routing module 222, a call recording and speech to text conversion module 220, an automated advisor module 216, a payment module 228 and a ratings module 230. The real-time advisory system 110 provides aggregating, categorizing, segregating, indexing, grading and also provides the ability to search for, communicate with and pay for topic based or contextual and categorized Human or Artificial Intelligence based real-time interactive video services or solutions via electronic communication networks—in any realm of interest to Humans or Computer systems including but not limited to sharing Information, Knowledge, Opinions, Observations and Guiding, Coaching, Tutoring, Mentoring, Entertaining, Translating, Interpreting, Counseling or providing personal or professional advice to Seekers who may be located in any part of the world, remotely over Internet, Cellular, Optical or Wireless based communication systems, to and from a remote location in any part of the world.

A seeker interface 218 on a computing device 104 with or without a GPS module provides an ability for the seeker to enter their contact information, language, preferences, payment details, and to enter the search topic (using text or voice input or other automated input from other search engines) on a topic of interest in a language requested by the seeker and to display the search results along with the ability to request a video call and the ability to provide feedback. The contact information, language, preferences, payment details and other information of seekers and their past searches, attempted or completed calls, call cost details and the feedback are stored in the database of seekers 202.

An advisor interface 226 on a computing device 114 with or without a GPS provides an ability to Advisors to enter their contact information, language, preferences, payment details, and to enter, using text or voice input, the topics in which they intend to offer real-time interactive video services, their self-rated knowledge or expertise levels and to display the calls received, completed or pending and their payments received or pending. The real-time advisory system 110 accumulates aggregates, segregates, indexes, grades and categorizes advisors and stores the contact information of the advisors, language, preferences, payment details, their past searches, missed or completed calls, call cost details and the feedback and information on advisors' payments received or pending.

The topic search engine 210 locates the advisors, based on factors such as quickest availability, lowest cost, nearest geographical distance of the advisor from the seeker, self/peer/independent agency assessed expertise level, endorsements (from sources such as Linkedin®, Facebook®), historical ratings from peers and other past customers of the advisor, past call rating or preferences of the specific seeker and/or other as context and relevance based inclusion or exclusion criteria independent of above using a machine learning based ranking for selection of advisors to answer the seeker using input data provided by seekers and advisors or gathered by the system 110 as training data.

The call routing module 222 routes a call between the seeker 102 and an advisor using an optimum call routing method. The optimum routing method includes one or more call methods. The one or more call methods include an optimum call connection or packet routing method (peer-to-peer) or conventional routing and connecting a voice or video call with the advisor. The call is routed by establishing a communication bandwidth optimized voice or video call (immediately or scheduled for a future time) between the seeker 102 and advisor selected by or for the seeker 102 and to provide the ability to compress, encode, encrypt, decompress, decode, decrypt, optionally turn-off video or audio or to allow or prevent recording of such calls by the seeker 102 or advisor along with any other known preferences or to block calls.

The call recording and speech to text conversion module 220 to record questions asked by seekers and the answers provided by advisors (with the ability to capture and store the approval of consent for recording by both parties) and to convert recorded calls to text using a speech-to-text conversion module and to index the recorded answers under the topics discussed. The recorded call includes questions asked by the seekers and answers provided by the advisors. The questions are stored in a database of recorded questions and the answers are stored in the database of the recorded answers. The database of recorded answers 212 is curated or augmented by external research and publications of expert advice on the topic of interest which are fed into the system as indexed additional sources of data to provide automated answers to the seekers questions based on the topic of interest. The speech advice is converted into text form using a speech-to-text conversion module (may be internal to the real-time advisory system or from external providers of such speech-to-text conversion tools). The speech-to-text conversion module translates audio into a language that a computer recognizes by picking up vibrations from the speech and feeding the vibrations to an analog-to-digital convertor for translating vibrations into digital data in text form.

The automated advisor module 216 uses data mining, machine learning and other neural networks based deep learning techniques to synthesize answers in text form to the questions asked by the seeker from the database of recorded answers and converting such synthesized text form answers into speech using a text-to-speech conversion module (may be internal to the real-time advisory system or from external providers of such text-to-speech conversion tools) and thus provide a virtual assistant for interactive responses to the seeker using the recorded answers. The automated advisor module 216 is activated when the seeker selects the option of obtaining answers from the automated advisor module 216. The automated advisor module 216 includes a machine learned ranking and answer synthesis system with seeker question 1110 and advisor answers 1111 as input along with the training data 1112. In a non-limiting example, the training data 1112 contains the seeker's question, topic of question, broad subject and categorization of question, preferred language, cost of answer, average ratings of the advisor's in his/her topics of expertise, topics of past answers, self-rating and peer rating of their expertise along with past ranking of advisor, ratings of the answers for precision, depth of information, relevance, currency of information, usefulness, the text form of the answers provided are curated using past answers, published work and researched answers and click-through logs are Indexed 1118 using conventional relational and object oriented techniques and used to produce a top-k retrieval 1122 of most relevant likely candidates for answers to produce a ranking model 1124 for use in a supervised learning algorithm along with training data from expert raters and supervisors of the rating 1114 along with reinforcement learning inputs 1115 and supervised learning inputs 1116 required for the learning algorithm 1120 along with a ranking model 1124 which are then combined with the top-k results 1122 to match previously asked questions that are similar to the present question on a ranking model 1125 and the highest ranked matches and corresponding highest ranked answers 1126 are used to synthesize answers using the past answers and ranks 1127 which are then presented for selection by the seeker as top ranked answers along with synthesized answers 1128 and formatted for consumption by the seeker 1130 in their preferred mode of communication. The ranked answer results are further used to create a profile of questions and answers 1140 to be fed as active inputs to the learning algorithm 1120 to further fine-tune synthesis of answers and their ranking for future queries.

The ratings module 230 to capture and store numerical, text, video or voice based feedback of seekers and advisors on each other's quality of the advice or conversation upon completion of the call from both seeker and advisor for use in future searches. The quality metrics may include but not limited to, attentiveness, responsiveness, expertise level, suitability of advice, and where the rating is below a threshold seek more descriptive reasons for a low feedback and a method to make recommendations to other seekers and to provide and obtain feedback on the usability of user interfaces and various technical quality aspects of the video call such as clarity, jitter, compression and buffering lags. The ratings module 230 will also enable blocking of spam and abusive seekers or advisors. A feedback (objective or subjective feedback) is obtained from the seeker for the advisor at the end of the call after seeking advice from the advisor. The feedback is fed as the training data or input data to the intelligent call routing system based on a plurality of criteria specified by the seeker and the topic of interest. The plurality of criteria includes at least one of (i) language, (ii) experience of the seeker in the past with the same advisor, (iii) subjective feedback, (iv) objective feedback, (v) a location, (vi) a cost, (vii) an availability and a rating of the advisor for each topic. The feedback data is indexed and a top-k (most likely candidates of advisors to be chosen) result set is retrieved and used as input in the intelligent call routing system in active and supervised learning for machine learned ranking of advisors. The results are then provided to the seeker and the feedback from the seeker for use in the intelligent call routing system to provide future advisors by the seeker for the topic of interest.

In an embodiment, a topic of interest from a current seeker is received by the real-time advisory system. Using a semantic system a level of similarity between questions asked by the current seeker with the recorded questions asked by the plurality of seekers is identified to provide the recorded answers, when the current seeker doesn't receive all the answers from the recorded answers then connecting the current seeker to an advisor for the unanswered topic by the intelligent call routing system.

The payment module 228 calculates a payment for interactive or recorded services given by the advisor to the seeker using the system 110 based on the type of advice sought by the current seeker. The payment module 228 collection of payment from seekers and to distribute payments to advisor for the interactive or recorded services and for usage of the infrastructure and computer systems of the real-time advisory system. The payment module 228 also provides usage based rewards, coupons and incentives for seekers and advisors and to securely collect from or send payments to advisors and to provide protection for seekers from inaccurate or unauthorized billing. In an embodiment a set of pre-recorded advertisements or live sales persons are added before or at the end of the call.

Figure 3:
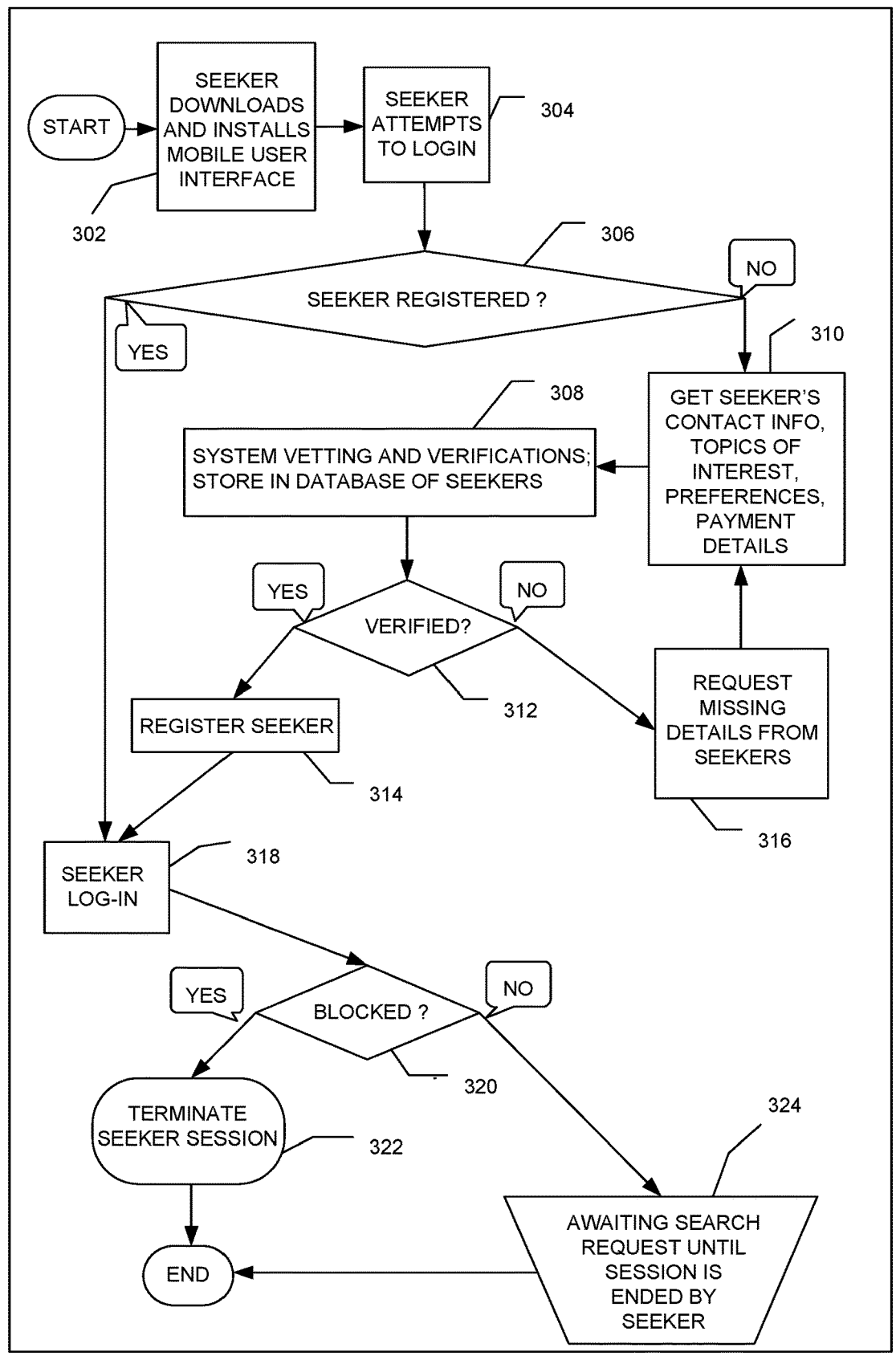
FIG. 3 is a flow chart illustrating a seeker registration and login process according to an embodiment herein.

FIG. 3 is a flow chart illustrating a seeker registration and login process according to an embodiment herein. At step, 302, involves downloading and installing the Mobile User Interface Module on the seekers computing device 104. At step, 304, involves the seeker 102 attempting to login which triggers the authentication module 208 to check if seeker 102 is registered 306 or not—if the seeker 102 happens to be registered then he is authenticated upon entering his login credentials 318 and if the seeker 102 is not in the list of blocked users 320, then the seeker 102 is allowed access to submit search requests to the Topic Search Engine 210. If the Seeker 102 does not happen to be registered then the system requests to Get Seeker's Contact info, Topics of Interest, Preferences, Payment details 310 and upon obtaining the requested details, the system performs a Vetting and Verification of the details provided by the seeker and stores those details in the database of Seekers 202. The Verification process may include an automated email or a text message to the phone or a credit card based validation of identity and age or by connecting to other social networks such as Facebook® or Linkedin® and once such verification is completed, the seeker 102 is recorded as a registered user and then he is authenticated upon entering his login credentials 310 and if the seeker 102 is in the list of blocked users 320, then the seekers session is terminated 322, if not the seeker 102 is allowed access to submit the search request 324. For e.g., the search topic 'best television to buy for a given budget' is fed to the Topic Search Engine 210. In another example, an advisor wishing to share his/her knowledge or opinion (for a fee or for free) on the 'best television to buy for a given budget' using his/her computing device, follows the step by step process shown in FIG. 4.

Figure 4:
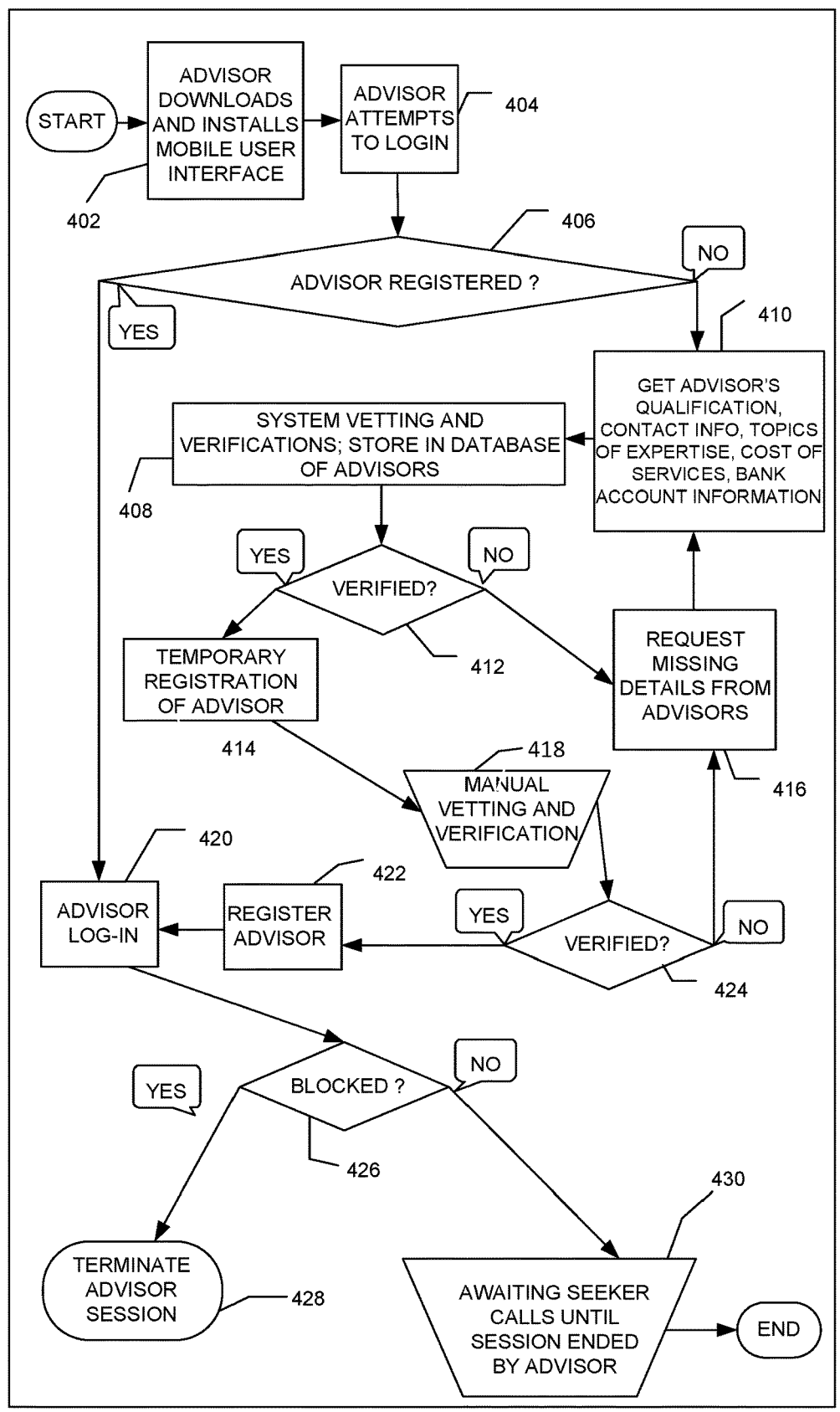
FIG. 4 is a flow chart illustrating an advisor registration and login process according to an embodiment herein.

FIG. 4 is a flow chart illustrating an advisor registration and login process according to an embodiment herein. At step, 402, involves downloading and installing the advisor's interface module 226 on the advisors computing device. At step, 404 involves the advisor attempting to login which triggers the authentication module 214 to check if advisor is registered 406, if the advisor happens to be registered; then advisor is authenticated upon entering his login credentials 420 and if the advisor is not in the list of blocked users 426, then the advisor is made available to the seeker in the search results fetched by the real-time advisory system based on topics of interest searched by the seeker and the topic of topic interest received by the Topic Search Engine 216. When the Advisor does not happen to be registered then the system requests to Get Advisor's Contact info, Topics of Expertise, Preferences, Payment details 410 and upon obtaining the requested details, the System performs a Vetting and Verification of the details provided by the Advisor and stores those details in the Database of Advisors 206. The Verification process could include an automated email or a text message to the phone or a credit card based validation of identity and age or by connecting to other social networks such as Facebook® or Linkedin®. If any details are missing or are unverified an automated request to submit such details is generated and sent to the Advisor and upon receipt of the response with the requested details and an automated verification of those details are complete the Advisor is recorded as a Temporary Registered Advisor 414. The details of the advisor are then forwarded by email or other notification methods to a team to manually verify 418 the advisor credentials and contact the Advisor for a telephonic interview and negotiation of the advisor service charges. Further details of the advisors may be obtained through a system generated request 416 and once the requisite details are received and verified, the Advisor is marked as a Registered Advisor 422. The advisor is then authenticated upon entering his login credentials 420 and if the advisor is in the list of Blocked users 426, then the advisor session is Terminated 428, if the advisor is not in the list of Blocked users 426, then the advisor is made available to the seeker in the search results fetched by the real-time advisory system based on topic of interest searched by the seeker and the topic of topic interest received by the Topic Search Engine 216 The advisor as part of his/her details provides the rate at which advisory services are chargeable. The system having provided for a plurality of advisors thus enables a marketplace for advisors to be selected according to the plurality of preferences of the seekers.

Figure 5:
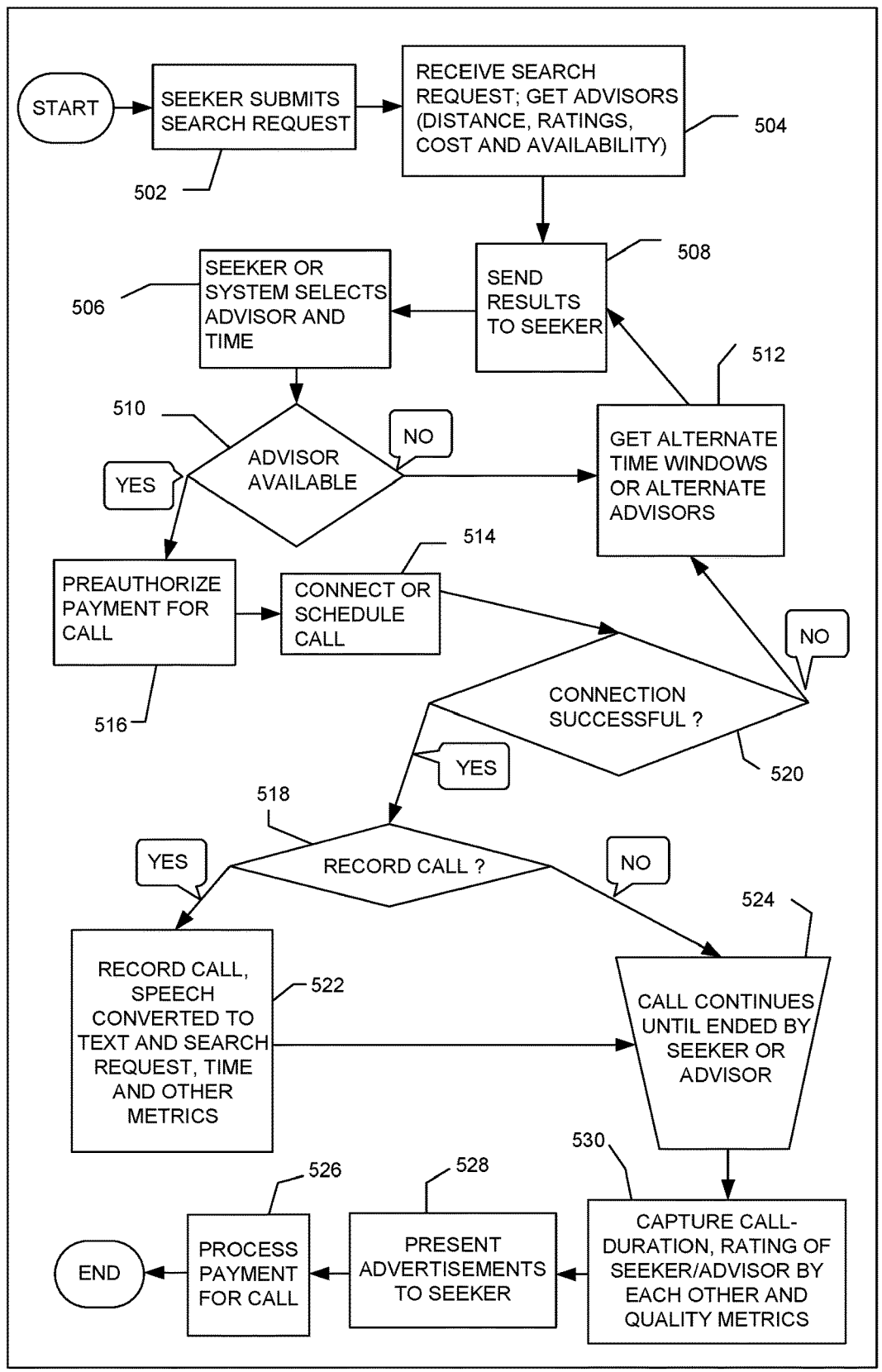
FIG. 5 is a flow chart illustrating a process of establishing a call between a seeker and an advisor according to an embodiment herein.

FIG. 5 is a flow chart illustrating a process of establishing a call between a seeker 102 and an advisor according to an embodiment herein. At step 502, the Seeker 102 enters a search query based on the topic of interest. The search query is received by the real-time advisory system. The intelligent call routing system of the real-time advisory system identifies the level of similarity between question asked by the seeker 102 in the form of search query by comparing the search query with the database of recorded questions asked by a plurality of seekers, if the question asked the seeker 102 is similar or same as the questions in the database of recorded questions then the set of suitable advisors or the automated advisor 216 are retrieved 504 and provided 508 to the seeker 102. The seeker 102 (or based on the seeker's preferences, the system automatically) selects a suitable Advisor 506. The intelligent call routing system then checks when the selected Advisor is available 510 and when for some reason the advisor is unavailable then it gets Alternate Time-windows or Alternate Advisors 512 and presents 508 the results to the Seeker 102. Once the Seeker 102 selects another available Advisor, the system then processes a payment pre-authorization 516 for the estimated or anticipated charges for the Call between the seeker and the advisor using the payment method selected by the seeker 102. At the successful completion of the payment pre-authorization, the system attempts to establish a Call with the Advisor 514 using the Call routing module 222. If the Call could not be successfully 520 established, then the intelligent call routing system gets Alternate Time-windows or Alternate Advisors 512 and presents the results to the Seeker 102. If the Call is successfully established 520, then the call may be Recorded 522 depending on the Seeker 102 and/or Advisor's preference. When the Call is recorded it may include steps involving Speech to Text conversion and storing both the Audio and Text data indexed along with the search topic, time, duration and other metrics related to the recorded solution 522. The Call between the Seeker 102 and Advisor continues until ended by either the Seeker or the Advisor 524 or interrupted. At the completion of the Call, the system presents an option for the Seeker 102 and Advisor to rate each other on the quality of their interaction and along with the metrics, the system captures and stores the Call-duration, time and other technical quality metrics 530. At this stage the Seeker may also be presented with a pre-recorded voice or video Advertisement 528 chosen to be relevant to the Seeker or pertaining to the seeker's present or past search topics and upon completion of the Advertisement a promotional discount may be applied to the final amount to be charged to the Seeker 102. The system then finalizes the charges for the transaction 526. An amount calculated based on the Call duration, the technical and subjective quality metrics or other promotional offers.

Figure 6:
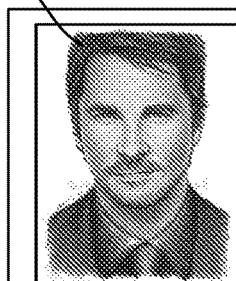
FIG. 6 is a seeker interface view illustrating an advisor rating and topic wise feedback from previous seekers according to an embodiment herein.

FIG. 6 is a seeker interface view 600 illustrating an advisor rating and topic wise feedback from previous seekers according to an embodiment herein. The seeker interface 600 includes background of the advisor 602 and over ratings of the advisor 602 given by other seekers. Based on the overall ratings and the back ground of the advisor 602 then the intelligent call-routing system fetches the advisor 602 to the seeker for seeking advice.

Figure 7:
FIG. 7 is a seeker interface view for obtaining an objective feedback of the advisor at the end of the call according to an embodiment herein.

FIG. 7 is a seeker interface view 700 for obtaining an objective feedback of the advisor at the end of the call according to an embodiment herein. The seeker interface view 700 includes a subjective feedback of the advisor to be given by the seeker 102. The seeker 102 may answer any one of subjective feedback questions. The seeker 102 can also recommend the advisor to other seekers. The feedback request may include topic wise feedback questions. The subjective feedback is analyzed by the intelligent call routing and automated advisor modules to update the rankings of the advisor.

FIG. 8 is a seeker interface view 800 for obtaining a subject feedback of the advisor at the end of the call according to an embodiment herein. The seeker interface view 800 includes a subjective feedback of the advisor to be given by the seeker 102. The subjective feedback is analyzed by the intelligent call routing and automated advisor to update the rankings of the advisor.

Figure 9A:
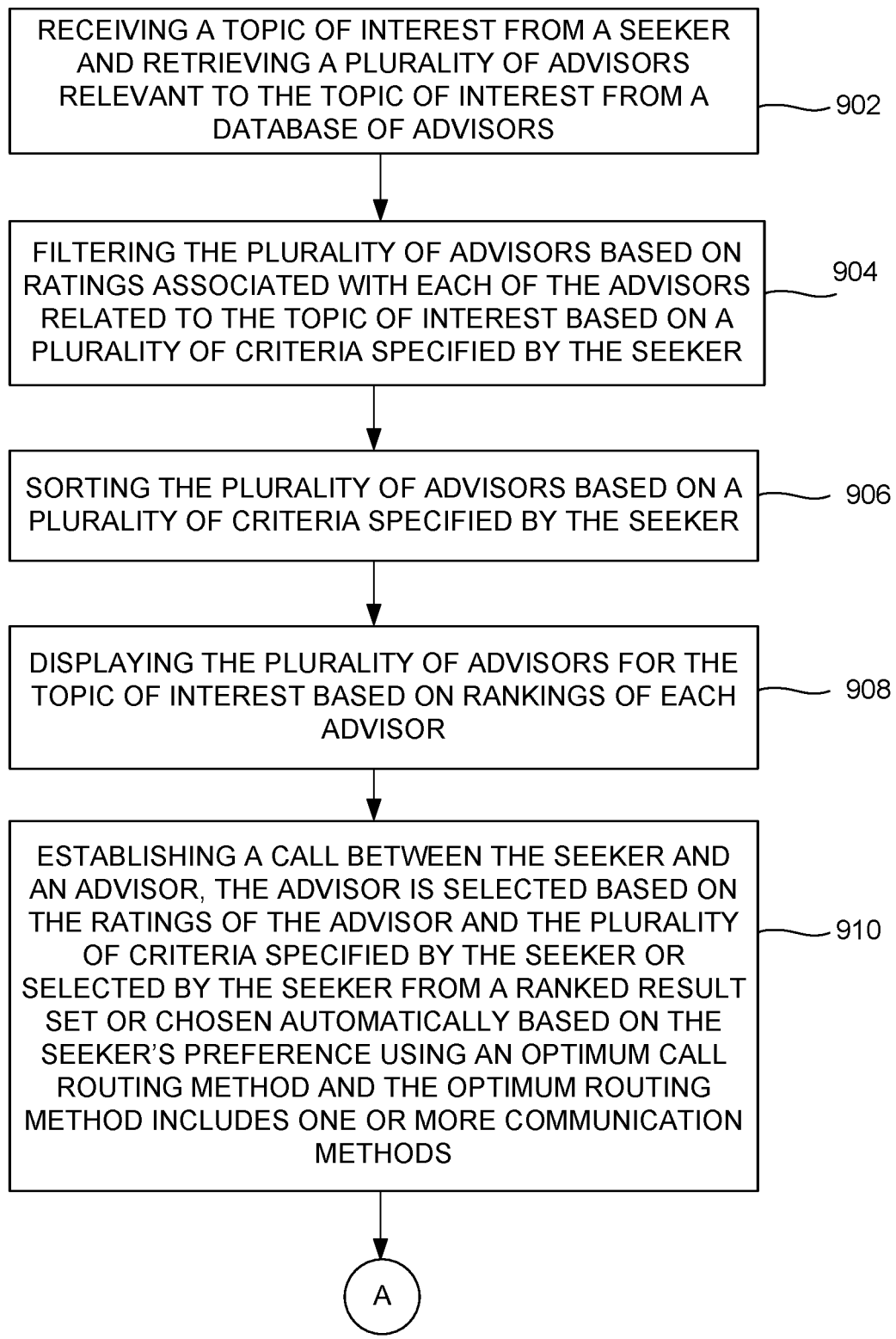
FIGS. 9A-9C illustrate a method for intelligently fetching advisors to seekers and providing recorded answers to the seekers using a machine learning system according to an embodiment here.
Figure 9B:
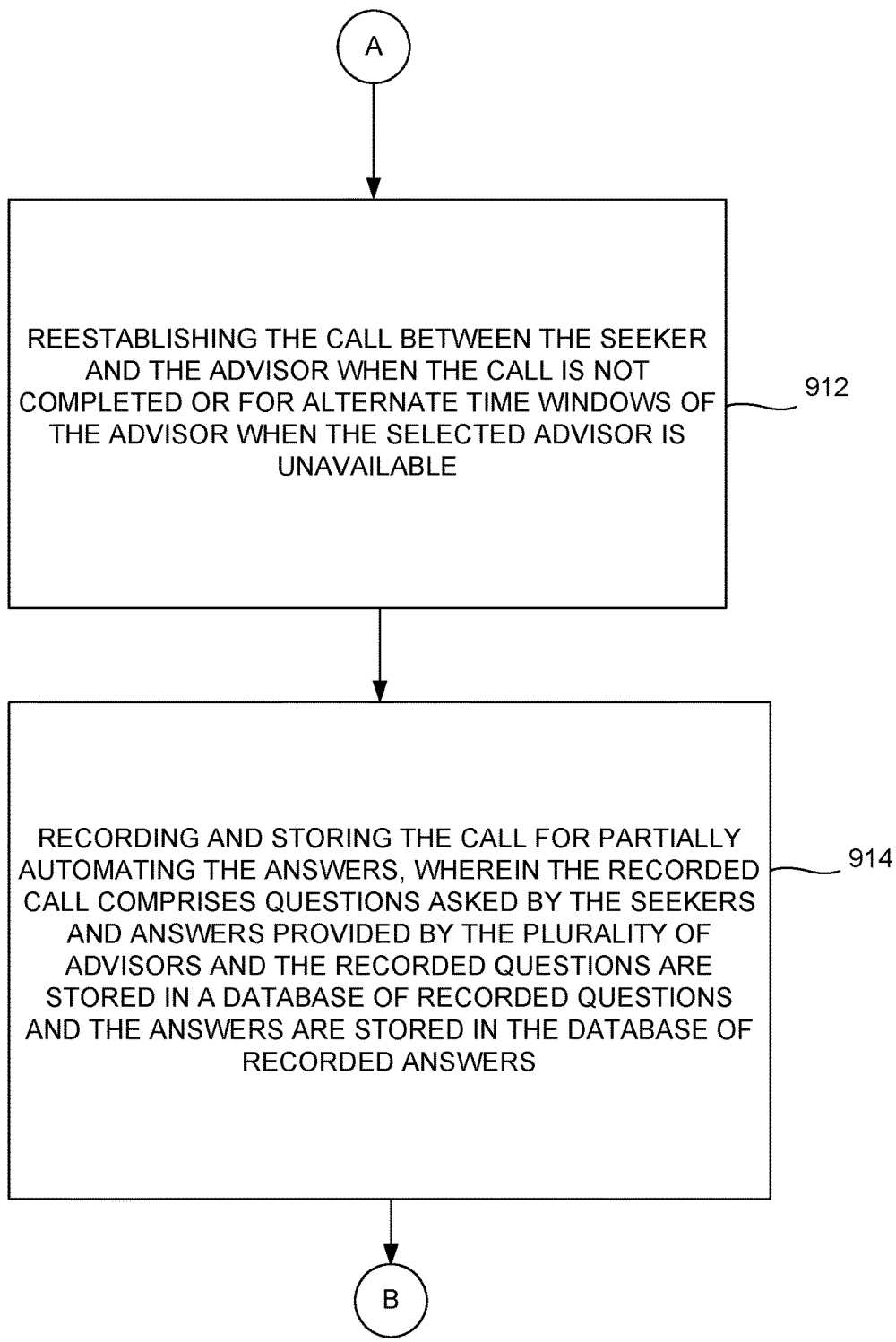
Figure 9C:
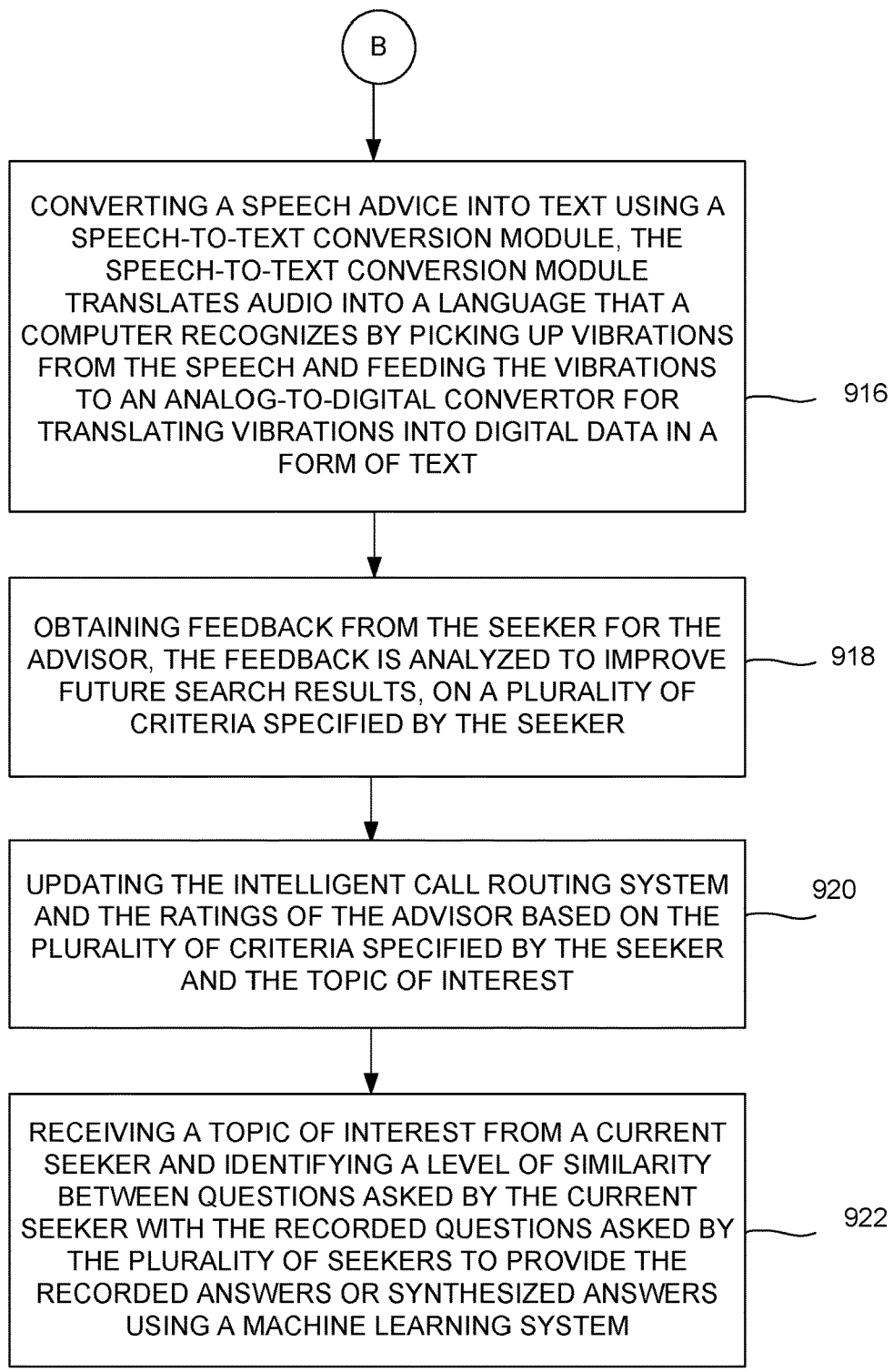
Figure 10:
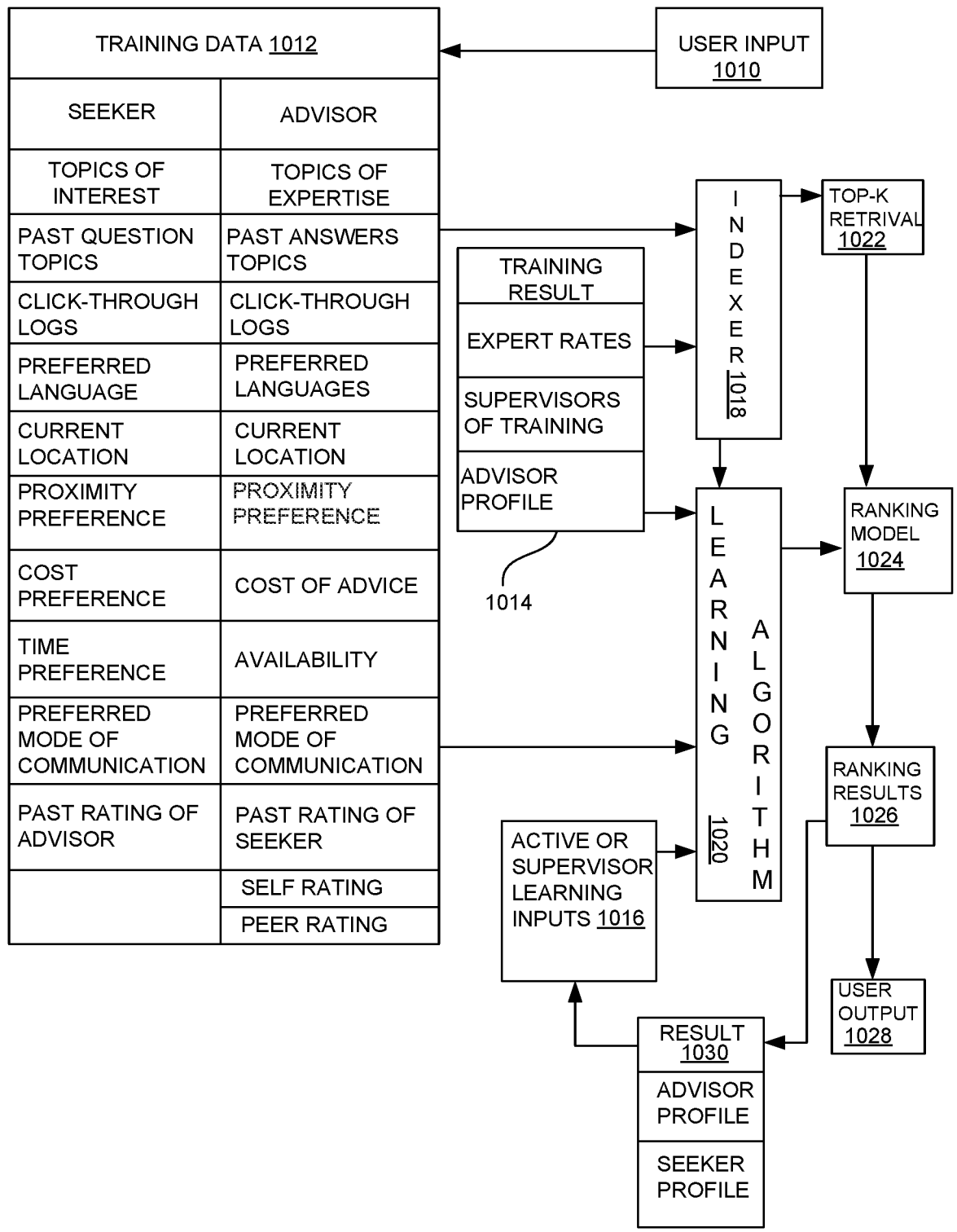
FIG. 10 illustrates a method for intelligently fetching advisors with expertise on a given topic of interest for the seeker according to an embodiment herein.

FIGS. 9A-9C illustrate a method for intelligently fetching advisors to seekers and providing recorded answers to the seekers using a machine learning system according to an embodiment here. At step, 902, a topic of interest is received from a seeker 102 and a plurality of advisors relevant to the topic of interest from a database of advisors is retrieved. At step, 904, the plurality of advisors is filtered based on ratings associated with each of the advisors related to the topic of interest based on a plurality of criteria specified by the seeker 102. At step, 906, the plurality of advisors is sorted based on a plurality of criteria specified by the seeker 102. At step, 908, the plurality of advisors is displayed based on the topic of interest and ranking of each advisor. At step, 910, a call is established between the seeker 102 and an advisor and the advisor is selected based on the ratings of the advisor and the plurality of criteria specified by the seeker 102 or selected by the seeker from a ranked result set or chosen automatically based on the seeker's preference using an optimum call routing method and the optimum routing method includes one or more call methods. The one or more call methods include an optimum call connection or packet routing method (peer-to-peer) or conventional routing and connecting a voice or video call with the advisor. At step, 912, the call is re-established between the seeker 102 and the advisor when the call is not completed or for alternate time windows of the advisor when the selected advisor is unavailable. At step, 914, the call is recorded and stored for partially automating the answers. The recorded call includes questions asked by the seekers and answers provided by the plurality of advisors. The recorded questions are stored in a database of recorded questions and the answers are stored in the database of recorded answers. The database of recorded answers is curated or augmented by external research and publications of expert advice on the topic of interest. At step, 916, a speech advice is converted into a text using a speech-to-text conversion module. The speech-to-text conversion module translates audio into a language that a computer recognizes by picking up vibrations from the speech and feeding the vibrations to an analog-to-digital convertor for translating vibrations into digital data in text form. At step, 918, a feedback is obtained from the seeker for the advisor. The feedback is analyzed by the intelligent call routing system based on a plurality of criteria specified by the seeker and the topic of interest. At step, 920, the intelligent call routing and automated advisor system and the ratings of the advisor is updated based on the plurality of criteria specified by the seeker and the topic of interest. At step, 922 a topic of interest is received from a current seeker and a level of similarity is identified between questions asked by the current seeker with the recorded questions asked by the plurality of seekers to provide the recorded answers or synthesized answers using a machine learning system FIG. 10 illustrates a method for intelligently fetching advisors with expertise on a given topic of interest for the seeker having a machine learned ranking system with user input 1010 provided by seekers and advisors or gathered by the real-time advisory system 110 as the training data 1012. The containing the seeker's topic of interest, topics of past questions, click through logs from previous advisor recommendations or other sources, preferred language, current location and preference of proximity range of advisor, cost preference, time window preference and preferred mode of communication and past ratings provided (if any) are taken in along with the advisor's topics of expertise, topics of past answers, click through logs, preferred languages, current location, proximity preference of seekers, cost of advice provided, availability time window, preferred mode of communication, self-rating and peer rating of their expertise along with past rating of seeker (if any) are Indexer 1018 using conventional relational and object oriented techniques and used to produce a top-k retrieval 1022 of most relevant likely candidates of advisors to produce a Ranking model 1024 for use in a supervised learning algorithm along with training data from Expert Raters and Supervisors of the rating 1014 along with Active inputs from Seekers and Supervisors of the learning 1016 required for the learning algorithm 1020 to produce Ranking results 1026 which are then formatted for use by the seeker 1028 and also for further use to create a profile of Advisors and Seekers 1030 to be fed as Active inputs 1016 to the learning algorithm 1020 to further fine-tune ranking of advisors for future seekers.

Figure 11:
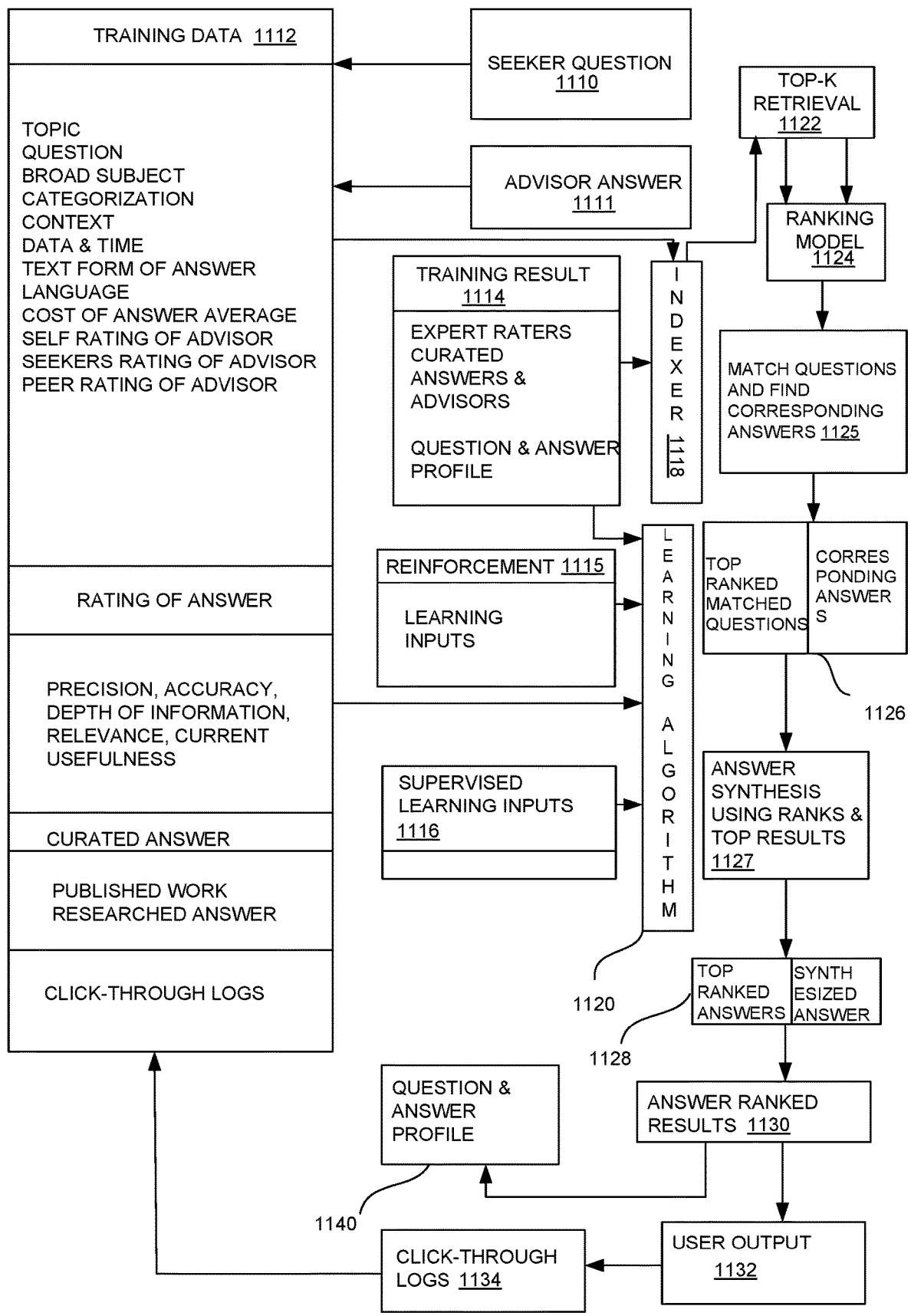
FIG. 11 illustrates a method for synthesizing answers from stored data for a given question according to an embodiment herein.

FIG. 11 illustrates a method for synthesizing answers from stored data for a given question by the seeker having a machine learned ranking and answer synthesis system with seeker question 1110 and advisor answers 1111 as input along with other data gathered used as training data 1112 containing the seeker's question, topic of question, broad subject and categorization of question, preferred language, cost of answer, average ratings of the advisor's in his topics of expertise, topics of past answers, self-rating and peer rating of their expertise along with past ranking of advisor along with ratings of the answers for precision, depth of information, relevance, currency of information, usefulness, the text form of the answer provided curated past answers, published work and researched answers and click-through logs are Indexer 1118 using conventional relational and object oriented techniques and used to produce a top-k retrieval 1122 of most relevant likely candidates for answers to produce a Ranking model 1124 for use in a supervised learning algorithm along with training data from Expert Raters and Supervisors of the rating 1114 along with Reinforcement learning inputs 1115 and Supervised learning inputs 1116 required for the learning algorithm 1120 along with a Ranking model 1124 which are then combined with the top-k results 1122 to match previously asked questions that are similar to the present question on a ranking model 1125 and the highest ranked matched questions and corresponding highest ranked answers 1126 are used to synthesize answers using the past answers and ranks 1127 which are then presented for selection by the seeker as top ranked answers along with synthesized answers 1128 and formatted for consumption by the seeker 1130 in their preferred mode of communication. The ranked answer results are further used to create a profile of Questions and Answers 1140 to be fed as Active inputs to the learning algorithm 1120 to further fine-tune synthesis of answers and their ranking for future queries.

Figure 12:
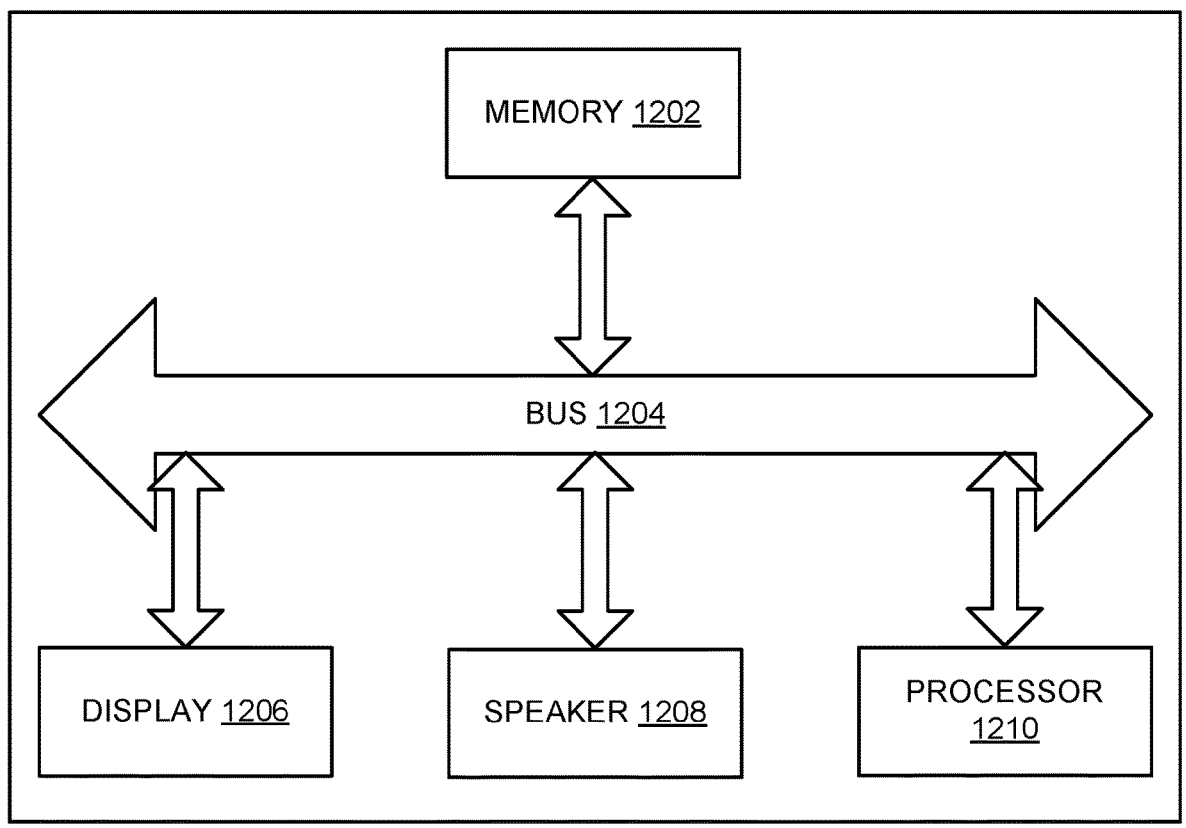
FIG. 12 illustrates an exploded view of a personal communication device according to the embodiments herein.

FIG. 12 illustrates an exploded view of the personal communication device having a memory 1202 with a set of computer instructions, a bus 1204, a display 1206, a speaker 1208, and a processor 1210 capable of processing a set of instructions to perform any one or more of the methodologies herein, according to an embodiment herein. The processor 1210 may also enable digital content to be consumed in the form of video for output via one or more displays 1206 or audio for output via speaker and/or earphones 1208. The processor 1210 may also carry out the methods described herein and in accordance with the embodiments herein.

Digital content may also be stored in the memory 1202 for future processing or consumption. The memory 1202 may also store program specific information and/or service information (PSI/SI), including information about digital content (e.g., the detected information bits) available in the future or stored from the past. A user of the personal communication device may view this stored information on display 1206 and select an item of for viewing, listening, or other uses via input, which may take the form of keypad, scroll, or other input device(s) or combinations thereof. When digital content is selected, the processor 1210 may pass information. The content and PSI/SI may be passed among functions within the personal communication device using the bus 1204.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in conjunction with a computer or any instruction execution system. For the purposes of this description, a computer-usable or computer readable medium can be any apparatus that can comprise, store, communicate, propagate, or transport the program for use by or in conjunction with the instruction execution system, apparatus, or device. The terms Machine learning and Artificial intelligence are interchangeably used in the disclosure.

The medium can be an electronic, magnetic, optical, electromagnetic, infrared, or a semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 13:
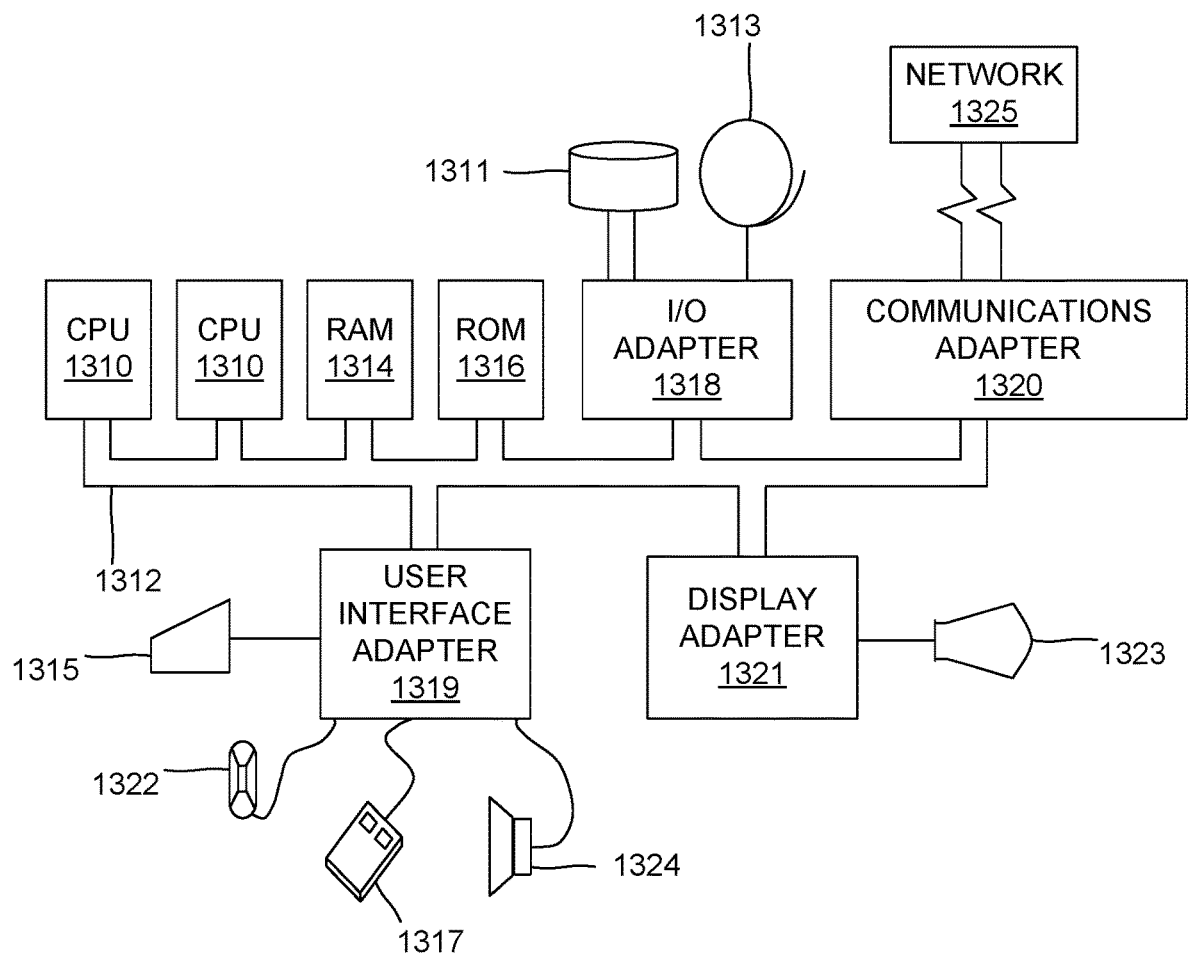
FIG. 13 is a schematic diagram of computer architecture used in accordance with the embodiment herein.

A representative hardware environment for practicing the embodiments herein is depicted in FIG. 13. This schematic drawing illustrates a hardware configuration of an information handling/computer system in accordance with the embodiments herein. The system comprises at least one processor or central processing unit (CPU) 1310. The CPUs 1310 are interconnected via system bus 1312 to various devices such as a random-access memory (RAM) 1314, read-only memory (ROM) 1316, and an input/output (I/O) adapter 1318. The I/O adapter 1318 can connect to peripheral devices, such as disk units 1311 and tape drives 1313, or other program storage devices that are readable by the system. The system can read the inventive instructions on the program storage devices and follow these instructions to execute the methodology of the embodiments herein.

The system further includes a user interface adapter 1319 that connects a keyboard 1315, mouse 1317, speaker 1324, microphone 1322, and/or other user interface devices such as a touch screen device (not shown) or a remote control to the bus 1312 to gather user input. Additionally, a communication adapter 1320 connects the bus 1312 to a data processing network 1325, and a display adapter 1321 connects the bus 1312 to a display device 1323 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for intelligently connecting seekers to advisors and providing recorded or synthesized answers to the seekers using artificial intelligence, the method comprising:

receiving a topic of interest from a seeker and retrieving a plurality of advisors relevant to the topic of interest from a database of advisors;

filtering the plurality of advisors based on rankings associated with each advisor related to the topic of interest based on a plurality of criteria specified by the seeker or on a machine learning based ranking of the advisors for the given topic, wherein the plurality of criteria comprises at least one of (i) a language, (ii) an experience of the seeker in the past with the same advisor, (iii) a subjective feedback, (iv) an objective feedback, (v) a location, (vi) a cost, (vii) an availability and a rating of the advisor for each topic;

sorting the plurality of advisors based on the plurality of criteria specified by the seeker;

displaying the plurality of advisors for the topic of interest based on the rankings of each advisor;

establishing a call between the seeker and an advisor, wherein the advisor is selected by at least one of (i) the ratings of the advisor and the plurality of criteria specified by the seeker, (ii) a selection of the seeker from a ranked result set or (iii) automatic selection based on the seeker's preference using an optimum call routing method, wherein the optimum call routing method comprises one or more communication methods;

recording and storing the call for automating the answers, wherein the recorded call comprises questions asked by the seekers and answers provided by the plurality of advisors, wherein the recorded questions are stored in a database of recorded questions and the answers are stored in a database of recorded answers;

converting a speech advice that is obtained from the recorded call into text using a call recording and speech-to-text conversion module, wherein the call recording and speech-to-text conversion module translates audio into a language that a computer recognizes by picking up vibrations from the speech and feeding the vibrations to an analog-to-digital convertor for translating the vibrations into digital data in text form;

obtaining a feedback from the seeker for the advisor, wherein the feedback is analyzed for improving future search results on the plurality of criteria specified by the seeker;

updating an intelligent call routing system and the rankings of the advisor based on the plurality of criteria specified by the seeker and the topic of interest;

curating the database of recorded answers by external research and publications of expert advice on various topics of interest to enable supervised learning of a machine learning system;

training a machine learning model using training data, wherein the training data includes a seeker's question, a broad subject or categorization of question, a cost of answer, a plurality of ratings of the advisor, a plurality of ratings of the answer, the text form of the answers and curated database of the recorded answers;

receiving a topic of interest from a current seeker; and generating a synthesized answer using the machine learning model, by identifying a level of similarity between questions asked by the current seeker with the recorded questions asked by the plurality of seekers using the machine learning system, wherein a top-k retrieval of candidate answers is combined with re-inforcement learning inputs, supervised learning inputs and a ranking model to generate the synthesized answers.

2. The method of claim 1, further comprising registering the plurality of advisors with expertise in various topics along with each advisor's topics of expertise and level of expertise in the database of advisors.

3. The method of claim 1, wherein the plurality of ratings of the advisor comprises an average rating of the advisor in his/her topics of expertise, a rating of the advisor in topics of past answers, a self-rating, a peer rating of the advisor's expertise and a past ranking of advisor.

4. The method of claim 1, wherein the plurality of ratings of the answer comprises a precision rating, a depth of information rating, a relevance rating, a currency of information rating and an usefulness rating.

5. The method of claim 1, wherein the call is re-established between the seeker and the advisor when the call is not completed or for alternate time windows of the advisor when the advisor is unavailable.

6. The method of claim 1, further comprising connecting the current seeker to other advisors when the current seeker doesn't receive all the answers from the recorded answers.

7. The method of claim 1, further comprising calculating a payment for interactive or recorded services given by the advisor to the seeker at a rate specified or modified by the advisors, wherein an amount of the calculated payment is used as the training data for the machine learning system.

8. The method of claim 1, further comprising converting the text of the recorded questions and answers into speech using the machine learning system for matching same or similar questions using the machine learning system based ranking of matching questions and by using the corresponding machine learning system based ranked answers of matched questions for providing recorded or synthesized answers for the same or similar question asked by other seekers.

9. The method of claim 1, further comprising storing details of the call such as system measured technical parameters, wherein the system measured technical parameters comprises connection mode, packet loss, compression, decompression algorithms, encryption along with subjective measures comprising the seeker or the advisor rating for the quality of the call and the quality of the interaction between the seeker and advisor, wherein the stored details of the call is used as the training data for the machine learning system.

10. The method of claim 1, further comprising displaying an estimated duration within which the advisor becomes available for the call and a duration for which the advisor is available.

11. A system comprising:
a device processor; and
a non-transitory computer readable storage medium storing one or more sequences of instructions, which when executed by the device processor, causes a method of intelligently fetching advisors to seekers by performing the steps of:

receiving a topic of interest from a seeker and retrieving a plurality of advisors relevant to the topic of interest from a database of advisors;

filtering the plurality of advisors based on rankings associated with each advisor related to the topic of interest based on a plurality of criteria specified by the seeker or on a machine learning based ranking of the advisors for the given topic, wherein the plurality of criteria comprises at least one of (i) a language, (ii) an experience of the seeker in the past with the same advisor, (iii) a subjective feedback, (iv) an objective feedback, (v) a location, (vi) a cost, (vii) an availability and a rating of the advisor for each topic;

sorting the plurality of advisors based on the plurality of criteria specified by the seeker;

displaying the plurality of advisors for the topic of interest based on the rankings of each advisor;

establishing a call between the seeker and an advisor, wherein the advisor is selected by at least one of (i) the ratings of the advisor and the plurality of criteria specified by the seeker, (ii) a selection of the seeker from a ranked result set or (iii) automatic selection based on the seeker's preference using an optimum call routing method, wherein the optimum call routing method comprises one or more communication methods;

recording and storing the call for automating the answers, wherein the recorded call comprises questions asked by the seekers and answers provided by the plurality of advisors, wherein the recorded questions are stored in a database of recorded questions and the answers are stored in a database of recorded answers;

converting a speech advice that is obtained from the recorded call into text using a call recording and speech-to-text conversion module;

obtaining a feedback from the seeker for the advisor, wherein the feedback is analyzed for improving future search results on the plurality of criteria specified by the seeker;

updating a call routing module and the rankings of the advisor based on the plurality of criteria specified by the seeker and the topic of interest;

curating the database of recorded answers by external research and publications of expert advice on various topics of interest to enable supervised learning of a machine learning system;

training a machine learning model using training data, wherein the training data includes a seeker's question, a broad subject or categorization of question, a cost of answer, a plurality of ratings of the advisor, a plurality of ratings of the answer, the text form of the answers and curated database of the recorded answers;

receiving a topic of interest from a current seeker; and generating a synthesized answer using the machine teaming model, by identifying a level of similarity between questions asked by the current seeker with the recorded questions that are asked by the plurality of seekers using the machine learning system, wherein a top-k retrieval of candidate answers is combined with re-inforcement learning inputs, supervised learning inputs and a ranking model to generate the synthesized answer.

* * * * *